US009715600B2

(12) United States Patent
Williams et al.

(10) Patent No.: US 9,715,600 B2
(45) Date of Patent: *Jul. 25, 2017

(54) FUEL DISPENSER USER INTERFACE SYSTEM ARCHITECTURE

(71) Applicants: Gilbarco Inc., Greensboro, NC (US); Gilbarco, S.r.l., Florence (IT)

(72) Inventors: Rodger K. Williams, Siler City, NC (US); Giovanni Carapelli, High Point, NC (US)

(73) Assignees: Gilbarco Inc., Greensboro, NC (US); Gilbarco, S.r.l., Florence (IT)

(*) Notice: Subject to any disclaimer, the term of this patent is extended or adjusted under 35 U.S.C. 154(b) by 0 days.

This patent is subject to a terminal disclaimer.

(21) Appl. No.: 15/049,750

(22) Filed: Feb. 22, 2016

(65) Prior Publication Data

US 2016/0171253 A1    Jun. 16, 2016

Related U.S. Application Data

(63) Continuation of application No. 14/089,443, filed on Nov. 25, 2013, now Pat. No. 9,268,930.
(Continued)

(51) Int. Cl.
*G06F 7/04*     (2006.01)
*G06F 21/83*    (2013.01)
(Continued)

(52) U.S. Cl.
CPC ............ *G06F 21/83* (2013.01); *G06F 21/36* (2013.01); *G06F 21/44* (2013.01); *G06F 21/52* (2013.01); *G06F 21/57* (2013.01); *G06F 21/84* (2013.01)

(58) Field of Classification Search
CPC ........... G06F 21/36; G06F 21/57; G06F 21/52
(Continued)

(56) References Cited

U.S. PATENT DOCUMENTS 4,200,770 A    4/1980 Hellman et al.
4,405,829 A    9/1983 Rivest et al.
(Continued)

FOREIGN PATENT DOCUMENTS

EP    1408459 A1    4/2004

OTHER PUBLICATIONS

"Unix Bible," Unix Bible, IDG Books Worldwide, US, Dec. 31, 2000 (Dec. 31, 2000), pp. 4-16, XP002341586.
(Continued)

*Primary Examiner* — Baotran N To
(74) *Attorney, Agent, or Firm* — Nelson Mullins Riley & Scarborough, LLP

(57) ABSTRACT

A vending machine can include a touch display and a touch controller operatively connected to the touch display and configured to transmit display data to the touch display and receive input data from a touchscreen function of the touch display. The vending machine also includes a secure device operatively connected to the touch display for securing the display by managing touch input information provided to one or more applications based on the input data received from the touchscreen functionality. The vending machine has a processor operatively connected to the secure device for communicating access requests for the touch display to the secure device from the one or more applications along with an indication of whether the one or more applications are signed by an authorized entity. The secure device manages the touch input information provided to the one or more applications further based at least in part on the indication.

9 Claims, 5 Drawing Sheets

Related U.S. Application Data

(60) Provisional application No. 61/731,211, filed on Nov. 29, 2012.

(51) Int. Cl.
  *G06F 21/36* (2013.01)
  *G06F 21/52* (2013.01)
  *G06F 21/57* (2013.01)
  *G06F 21/44* (2013.01)
  *G06F 21/84* (2013.01)

(58) Field of Classification Search
  USPC .......................................................... 726/2
  See application file for complete search history.

(56) References Cited

U.S. PATENT DOCUMENTS

| | | | |
|---|---|---|---|
| 4,797,920 A | 1/1989 | Stein | |
| 5,228,084 A | 7/1993 | Johnson et al. | |
| 5,493,613 A | 2/1996 | Denno et al. | |
| 5,790,410 A | 8/1998 | Warn et al. | |
| 5,832,206 A | 11/1998 | DeJesus et al. | |
| 6,026,492 A | 2/2000 | Cromer et al. | |
| 6,115,819 A | 9/2000 | Anderson | |
| 6,185,307 B1 | 2/2001 | Johnson, Jr. | |
| 6,317,835 B1 | 11/2001 | Bilger et al. | |
| 6,360,138 B1 | 3/2002 | Coppola et al. | |
| 6,442,448 B1 | 8/2002 | Finley et al. | |
| 6,577,734 B1 | 6/2003 | Etzel et al. | |
| 6,669,100 B1 | 12/2003 | Rogers et al. | |
| 6,736,313 B1 | 5/2004 | Dickson | |
| 6,789,733 B2 | 9/2004 | Terranova et al. | |
| 7,047,223 B2 | 5/2006 | Watlington | |
| 7,054,829 B2 | 5/2006 | Campo et al. | |
| 7,215,775 B2 | 5/2007 | Noguchi et al. | |
| 7,248,719 B2 | 7/2007 | Hoffman et al. | |
| 7,254,463 B1 | 8/2007 | Moore | |
| 7,370,200 B2 | 5/2008 | Kindberg et al. | |
| 7,607,576 B2 | 10/2009 | Robertson et al. | |
| 7,699,757 B2 | 4/2010 | Clem et al. | |
| 7,953,968 B2 | 5/2011 | Robertson et al. | |
| 8,009,832 B2 | 8/2011 | Suh et al. | |
| 8,195,328 B2 | 6/2012 | Mallett et al. | |
| 8,392,846 B2 | 3/2013 | Carapelli | |
| 8,558,685 B2 | 10/2013 | Long et al. | |
| 9,268,930 B2* | 2/2016 | Williams | G06F 21/36 |
| 2002/0026575 A1 | 2/2002 | Wheeler et al. | |
| 2002/0066020 A1 | 5/2002 | Whytock | |
| 2002/0124170 A1 | 9/2002 | Johnson, Jr. | |
| 2002/0136214 A1 | 9/2002 | Do et al. | |
| 2002/0138554 A1 | 9/2002 | Feigen et al. | |
| 2002/0153424 A1 | 10/2002 | Li | |
| 2002/0157003 A1 | 10/2002 | Beletski | |
| 2002/0174067 A1 | 11/2002 | Hoffman et al. | |
| 2002/0191029 A1 | 12/2002 | Gillespie et al. | |
| 2003/0002667 A1 | 1/2003 | Gougeon et al. | |
| 2003/0030720 A1 | 2/2003 | Hutchings | |
| 2003/0055738 A1 | 3/2003 | Alie | |
| 2003/0194071 A1 | 10/2003 | Ramian | |
| 2004/0172339 A1 | 9/2004 | Snelrove et al. | |
| 2005/0145690 A1 | 7/2005 | Shibasaki | |
| 2005/0278533 A1 | 12/2005 | Mayer | |
| 2006/0089145 A1 | 4/2006 | Chen et al. | |
| 2007/0033398 A1* | 2/2007 | Robertson | G07F 7/1008 713/168 |
| 2007/0204173 A1 | 8/2007 | Kuhn | |
| 2009/0064273 A1 | 3/2009 | Buer | |
| 2009/0154696 A1 | 6/2009 | Robertson et al. | |
| 2010/0020971 A1 | 1/2010 | Hanks et al. | |
| 2010/0230437 A1* | 9/2010 | Carapelli | B67D 7/20 222/71 |
| 2010/0258624 A1 | 10/2010 | Nochi | |
| 2010/0268612 A1 | 10/2010 | Berrio et al. | |
| 2011/0047081 A1 | 2/2011 | Kelly et al. | |
| 2011/0099279 A1* | 4/2011 | Hooper | H04L 12/2697 709/227 |
| 2011/0134044 A1 | 6/2011 | Carapelli | |
| 2011/0185319 A1* | 7/2011 | Carapelli | G06Q 20/206 715/863 |
| 2011/0199308 A1* | 8/2011 | Nativel | G06F 21/606 345/168 |
| 2011/0231648 A1 | 9/2011 | Robertson et al. | |
| 2011/0238511 A1 | 9/2011 | Park et al. | |
| 2012/0059694 A1 | 3/2012 | Kuebert et al. | |
| 2012/0117664 A1 | 5/2012 | Ezell et al. | |
| 2012/0166343 A1 | 6/2012 | Carapelli et al. | |
| 2012/0286760 A1 | 11/2012 | Carapelli et al. | |
| 2013/0300453 A1 | 11/2013 | Carapelli et al. | |
| 2014/0358705 A1 | 12/2014 | Harrington et al. | |

OTHER PUBLICATIONS

European Examination Report issued on Dec. 6, 2016 in corresponding European patent application serial No. 13858254.9, all enclosed pages cited.

Extended European Search Report issued on Mar. 31, 2016 in corresponding European patent application No. 13858254.9, all enclosed pages cited.

International Search Report and Written Opinion mailed on May 14, 2014 in corresponding international application No. PCT/US2013/071897, all enclosed pages cited.

Gilbarco: SMARTConnect, from http://www.gilbarco.com/ind_producl.cfm?ContentItemID=185, all enclosed pages cited.

"Smart Connect" Product Brochure by Gilbarco Veeder-Root, copyright 2004 Gilbarco Inc., all enclosed pages cited.

"Payment Card Industry ("PCI") PIN Entry Device Testing and Approval Program Guide", Version 4.0, Sep. 2004, Visa Public, all enclosed pages cited.

"Payment Card Industry ("PCI") PIN Entry Device Testing and Approval Program Guide," Version 4.0, VISA Public, Sep. 2004, all enclosed pages cited.

"TFT Color LCD Module: Type NL6448CC33-30W 26cm (10.4 Type), VGA," 4th ed., NEC Corporation, Jul. 13, 2000, all enclosed pages cited.

"Payment Card Industry ("PCI") POS PIN Entry Device Security Requirements Manual," Version 1.2, Sep. 2004, all enclosed pages cited.

"PCI POS PED Evaluation FAQ (Technical)," Sep. 21, 2004, all enclosed pages cited.

Chapter 7 of Book 4 of Version 4.1 of the Europay MasterCard Visa ("EMV") standard for Integrated Circuit Card Specifications for Payment Systems (May 2004), all enclosed pages cited.

Non-Final Office Action issued on May 19, 2016 in co-pending U.S. Appl. No. 13/655,938 and its corresponding response filed on Oct. 19, 2016, all enclosed pages cited.

* cited by examiner

FUEL DISPENSER USER INTERFACE SYSTEM ARCHITECTURE

CROSS-REFERENCE TO RELATED APPLICATIONS

The present application is a continuation of application Ser. No. 14/089,443, filed Nov. 25, 2013, now U.S. Pat. No. 9,268,930, which claims the benefit of U.S. provisional application Ser. No. 61/731,211, filed Nov. 29, 2012, both of which are entitled "FUEL DISPENSER USER INTERFACE SYSTEM ARCHITECTURE." The foregoing applications are both incorporated herein by reference as if set forth verbatim in their entirety and are relied upon for all purposes.

TECHNICAL FIELD

The subject matter described herein relates generally to fuel dispensers, and more specifically to user interfaces employed by fuel dispensers.

BACKGROUND

Fuel dispensers typically include a controller configured to handle sensitive payment information received from a user to effect payment for fuel dispensed to the user. The sensitive payment information is usually provided to the fuel dispenser via one or more components, such as a card reader and a PIN pad. Any sensitive payment information received by the PIN pad is generally encrypted and forwarded to the controller regardless of whether the PIN pad uses a separate controller. Because the controller is configured to handle the sensitive payment information, it is usually subject to certain security requirements imposed on devices that handle such information, which may include a manual offline certification process.

Some dispensers employ large display screens, not only for prompting the user to enter payment information, select fuel grades, elect a car wash, etc. via a PIN pad or other buttons, but also to display advertisements, loyalty information, menus for a kitchen inside a service station, and other information. Existing touchscreen displays allow user interaction by touching regions on the display. Due to certain regulations, however, such touchscreen displays can be limited in functionality provided to users.

SUMMARY

The following presents a simplified summary of one or more aspects of the subject matter disclosed herein to provide a basic understanding thereof. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that follows.

Various aspects described herein relate to controlling a touchscreen display via a secure device to regulate allowed functionality for applications or related devices accessing the touchscreen display, whether the access is for displaying content and/or receiving touch input related to such content. In one example, the functionality can be restricted for certain applications based on a type of the applications, based on whether the applications are signed with a signature of an authorized entity, based on whether another application is currently using the touchscreen display, and/or the like. Moreover, the functionality can vary in such scenarios, such as offering a limited number of touch regions on the touchscreen display to applications that are not signed with a signature of an authorized entity and/or applications that are of a certain type. Anti-tampering devices can be used to facilitate physical security of various devices, such as the device controlling the touchscreen display, a processor executing the applications, etc.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations may denote like elements, and in which.

DETAILED DESCRIPTION

Figure 1:
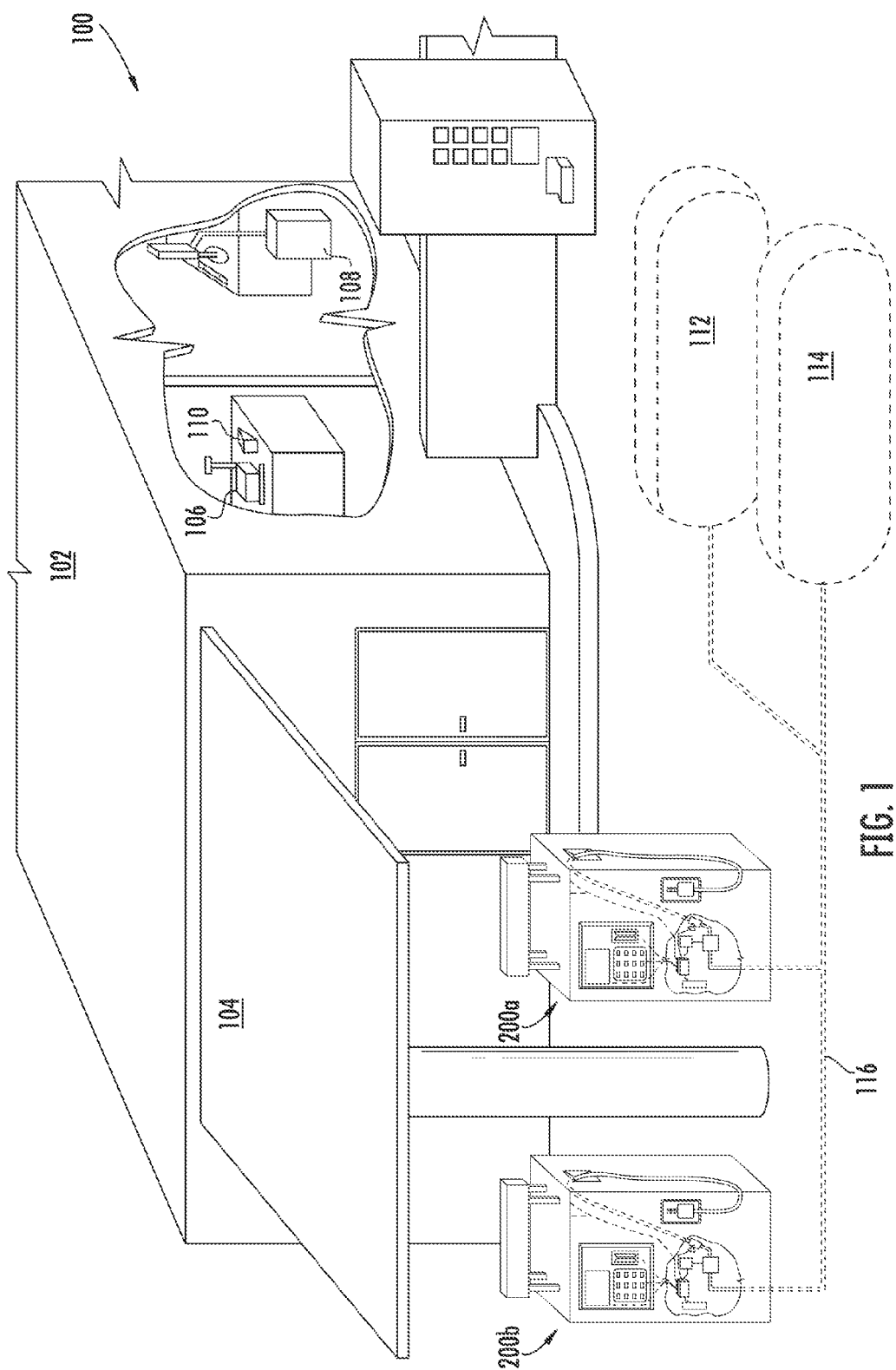
FIG. 1 is a partially schematic, perspective view of a fueling environment in accordance with aspects described herein.

Reference will now be made in detail to various aspects, one or more examples of which are illustrated in the accompanying drawings. Each example is provided by way of explanation, and not limitation of the aspects. In fact, it will be apparent to those skilled in the art that modifications and variations can be made in the described aspects without departing from the scope or spirit thereof. For instance, features illustrated or described as part of one example may be used on another example to yield a still further example. Thus, it is intended that the described aspects cover such modifications and variations as come within the scope of the appended claims and their equivalents.

Described herein are various aspects relating to controlling a touchscreen display using a secure device at a fuel dispenser to provide a level of control over the functionality of the touchscreen display. Thus, functionality of the touchscreen display can be limited for certain applications. In an example, a controller for the touchscreen display can limit the functionality for applications based on application type, based on whether the applications are signed by an authorized entity, based on whether another application is using the touchscreen display, and/or the like. For example, the controller can limit the touchscreen display at least in part by filtering input event-related information provided to the one or more applications, blocking touchscreen display access from the one or more applications, and/or the like.

In one specific example, the controller can operate within a personal identification number (PIN) entry device (PED) of a fuel dispenser, or at least a device comprising a subset of PED components. In this example, the PED can include one or more feature connectors for coupling the touchscreen display to provide display data thereto and/or receive touch input events therefrom. The PED can provide overriding secure control of the touchscreen display via the controller. The PED can also communicate with one or more applications or related devices to provide some touchscreen display functionality thereto subject to the overriding secure control.

For instance, a system on module (SoM) can establish a secure channel with the PED to communicate encrypted application data with the PED. When the SoM executes an application signed by an authenticated entity, it can indicate to the PED that data to/from the application is from an authenticated source. Based on this information, the PED determines and accordingly provides a level of access of the touchscreen display to the application.

Moreover, though illustrated and described as embodied in a fuel dispenser, it is to be appreciated that aspects described herein can be similarly applied to substantially any vending machine that processes transaction payment or other processes involving confidential information while maintaining the ability to execute other applications.

Certain aspects of the embodiments described herein are related to fueling environments, fuel dispensers, and user interfaces for fuel dispensers, examples of which may be found in U.S. patent publication nos. 2009/0265638 (entitled "System and Method for Controlling Secure Content and Non-Secure Content at a Fuel Dispenser or Other Retail Device" and filed on Oct. 10, 2008), 2011/0047081 (entitled "Secure Reports for Electronic Payment Systems," and filed on Aug. 20, 2009), 2010/0268612 (entitled "Payment Processing System for Use in a Retail Environment Having Segmented Architecture," and filed on Jan. 19, 2010), 2011/0134044 (entitled "Fuel Dispenser User Interface," and filed on Jun. 9, 2010), 2012/0166343 (entitled "Fuel Dispensing Payment System for Secure Evaluation of Cardholder Data," and filed on Dec. 22, 2010), 2011/0238511 (entitled "Fuel Dispenser Payment System and Method," and filed on Mar. 7, 2011), 2012/0286760 (entitled "Fuel Dispenser Input Device Tamper Detection Arrangement," and filed on May 11, 2011), 2011/0231648 (entitled "System and Method for Selective Encryption of Input Data During a Retail Transaction," and filed on May 27, 2011), 2012/0059694 (entitled "Fuel Dispenser Application Framework" and filed on Aug. 3, 2011), and 2013/0300453 (entitled "Fuel Dispenser Input Device Tamper Detection Arrangement" and filed on May 9, 2012), U.S. Pat. No. 7,607,576 (entitled "Local Zone Security Architecture for Retail Environments" and issued on Oct. 27, 2009), U.S. Pat. No. 8,392,846 (entitled "Virtual PIN pad for Fuel Payment Systems," and filed on Jan. 28, 2010), and U.S. Pat. No. 8,558,685 (entitled "Remote Display Tamper Detection Using Data Integrity Operations" and filed on Aug. 29, 2011), and European patent application U.S. Pat. No. 1,408,459 (entitled "Secure Controller of Outdoor Payment Terminals in Compliance with EMV Specifications" and published on Apr. 14, 2004). Each of the foregoing applications and patent is hereby incorporated by reference as if set forth verbatim in its entirety herein and relied upon for all purposes.

FIG. 1 is a partially schematic, perspective view of a fueling environment 100 adapted to provide fuel and to accept payment for the dispensed fuel. Fueling environment 100 includes at least one fuel dispenser 200a and a central facility 102. Typically, one or more additional fuel dispensers, such as fuel dispenser 200b, may also be included within fueling environment 100. Fueling environment 100 may also include a canopy system 104 that provides shelter to fuel dispensers 200a and 200b.

Central facility 102 includes a point-of-sale device (POS) 106 and a site controller 108 and may include additional computing devices, such as cashier and/or manager workstations. In the example illustrated, POS 106 includes an associated card reader and payment terminal 110. Each of POS 106 and site controller 108 may also include a display, a touchscreen, and/or other devices, such as a printer. It should be understood that the functionality of POS 106, site controller 108, and any additional computing devices within central facility 102 may be incorporated into a single computer or server. Alternatively, these computing devices may be operatively interconnected via a local area network (LAN). An example of a suitable system that may be used in conjunction with subject matter described herein combines the functions of POS 106 and site controller 108, to which multiple payment terminals 110 may be operatively connected, is the PASSPORT system offered by Gilbarco Inc. of Greensboro, N.C.

It is to be appreciated that fueling environment 100 may include a number of other components to facilitate the dispensing of fuel. In the example provided by FIG. 1, for instance, fueling environment 100 includes two underground storage tanks (USTs) 112 and 114 configured to store fuel that is available for purchase. For example, USTs 112 and 114 may be stocked with respective grades of fuel. USTs 112 and 114 are in fluid communication with an underground piping network 116 to which dispensers 200a and 200b are connected. As a result, fuel stored within USTs 112 and 114 may be delivered to the dispensers for purchase. Moreover, in one example, information regarding the USTs 112 and 114 (e.g., a tank level, an environment indicator, such as temperature around the tank, etc.) can be communicated to the POS 106, site controller 108, or other device to allow for tank monitoring and/or notification of other issues.

Figure 2:
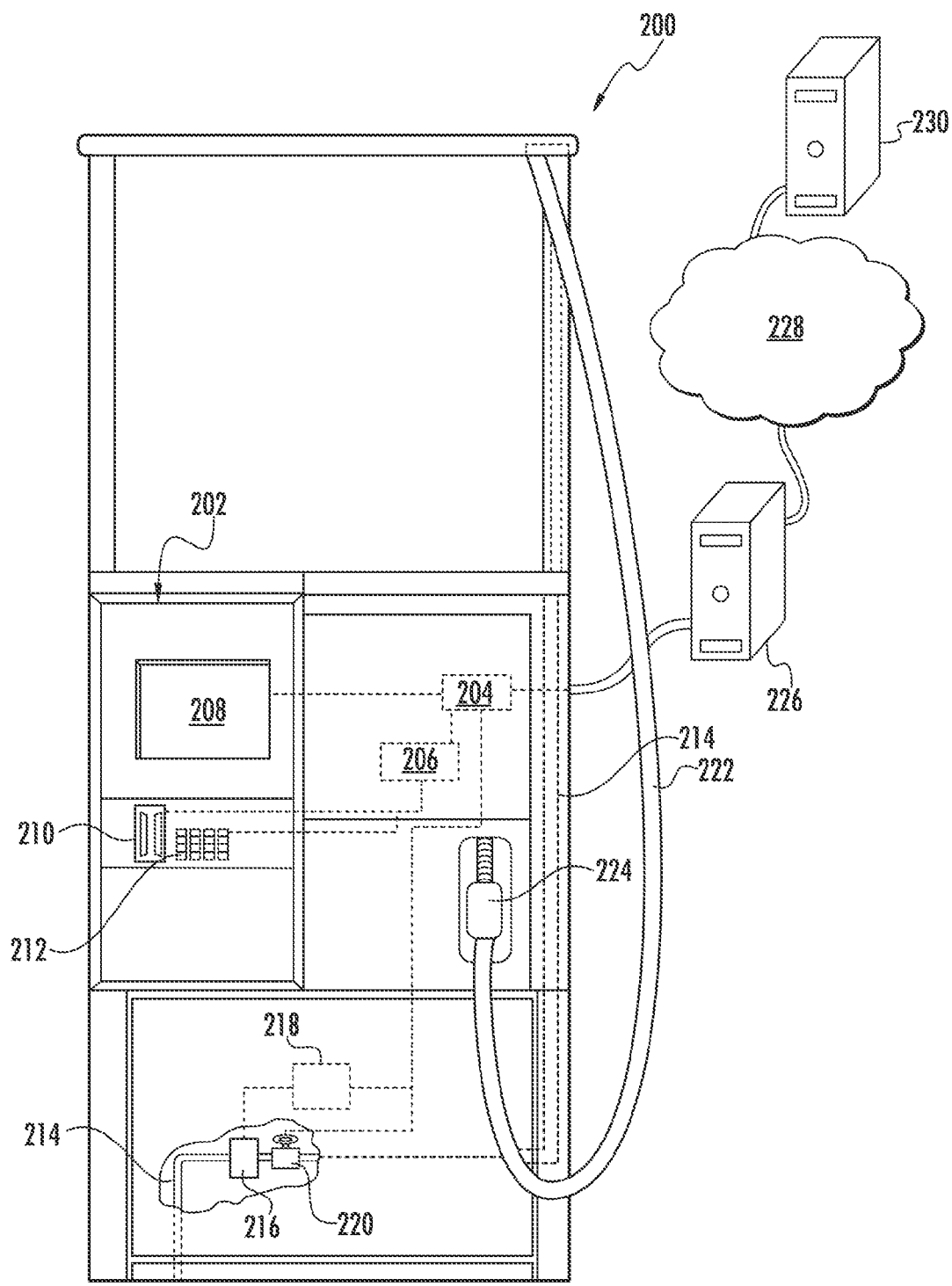
FIG. 2 is a partially schematic, front elevation view of a fuel dispenser that may be used in the fueling environment of FIG. 1 in accordance with aspects described herein.

FIG. 2 is a partially schematic, front elevation view of a fuel dispenser 200 that may be used as fuel dispensers 200a and 200b in the fueling environment of FIG. 1. Fuel dispenser 200 includes a user interface 202 that includes a first controller 204, a second controller 206, a display 208, a card reader 210, and a numeric pad 212. Controller 204 is operatively connected to controller 206 and to display 208, while controller 206 is operatively connected to controller 204 and to card reader 210 and numeric pad 212. It is to be appreciated that user interface 202 may include other components, such as a cash acceptor and/or a receipt printer, etc. Each of controllers 204 and 206 preferably includes an Ethernet adapter and communicates with the other controller via the transmission control protocol and the Internet protocol (e.g., transmission control protocol (TCP)/internet protocol (IP), user datagram protocol (UDP), etc.), as explained below. Alternatively, controllers 204 and 206 may be connected via a universal serial bus (USB) connection and configured to communicate via the USB connection or other wired or wireless (e.g., Bluetooth, wireless local area network (WLAN), etc.) connection. In one example, one or more of the controllers 204 and 206 may be included within devices of the fuel dispenser 200, such as display 208, PIN pad 212, etc., as describer further herein, and in some examples, one or more of the controllers 204 and 206 may not be present, or maybe replaced by another controller where the remaining controller implements functionality such that the replaced controller is not needed.

For purposes of the ensuing explanation, it is to be appreciated that card reader 210 may be any device or combination of devices configured to receive data from payment cards supplied by users that contain sensitive or confidential account or payment information (referred to generally herein as sensitive information or confidential information). Card reader 210, for instance, may be a magnetic stripe card reader, a smart card reader, a contactless card reader, a radio frequency (RF) reader, or any combination thereof. Thus, the term "payment card" as used herein is intended to encompass magnetic stripe cards, smart cards, contactless cards, and RF devices, as well as other forms of cards and devices that are configured to store and provide account information. Information received from such a payment card is referred to herein as "payment data" for purposes of explanation, while the portion of the payment data sufficient to identify the account associated with the payment card is referred to as "sensitive payment data." Thus, it is to be appreciated that "payment data" as used herein may include both sensitive and non-sensitive payment information. Moreover, it is to be appreciated that "sensitive payment data" may include other confidential information, such as a PIN associated with the payment card, and is also referred to generally as "sensitive data," "confidential information," or similar terms.

In the presently-described example, card reader 210 is configured to accept payment data from various types of payment cards, including credit and debit cards, prepaid and gift cards, fleet cards, any local/private cards, etc. accepted by fueling environment 100. It should be appreciated that card reader 210 may also be configured to receive account information from non-payment and other cards, such as loyalty, frequent shopper, rewards, points, advantage, and club cards. In addition, mobile payment can be provided such that a card need not be used to pay at fuel dispenser 200 and/or a communication from a mobile device at the fuel dispenser (e.g., a near field communication (NFC) with a NFC reader on fuel dispenser, a communication initiated over a mobile network, etc.) can be used to initiate payment. Numeric pad 212 is also configured to receive payment data, such as the PIN associated with a payment card and/or mobile payment. For at least this reason, numeric pad 212 may be referred to in the ensuing explanation as a PIN pad or PED.

Moreover, it is to be appreciated that fuel dispenser 200 also includes various fuel dispensing components configured to facilitate the delivery of fuel to a vehicle. For instance, fuel dispenser 200 additionally includes a piping network 214, a meter 216, a pulser 218, a valve 220, a hose 222, and a nozzle 224, which can be duplicated to allow delivery of multiple fuel grades. Controller 204 is operatively connected to one or more of these components, such as pulser 218 and valve 220, to control operation thereof and/or to manage the delivery of fuel by fuel dispenser 200. Piping network 214 is in fluid communication with underground piping network 116, as described in FIG. 1, to receive fuel from the USTs. Piping network 214, hose 222, and nozzle 224 are also in fluid communication to supply the fuel to a vehicle. In other examples described herein, fuel dispenser 200 may include one of controllers 204 and 206, in which case controller 206 may operate the fuel dispensing components instead (or in addition).

User interface 202 is configured to facilitate the dispensing of fuel and the acceptance of payment for the dispensed fuel. For instance, display 208 is configured to provide instructions to a user regarding the fueling process and to display totals during and at the completion of the transaction. Display 208 can be a liquid crystal display (LCD), light emitting diode (LED) display, plasma display, etc. In addition, display 208 can be a touchscreen or a non-touchscreen display. Card reader 210 and PIN pad 212 are configured to accept payment data (e.g., as provided by the user). That is, card reader 210 can be configured to receive account information from a payment card, such as a credit or debit card. PIN pad 212 is configured to at least receive information associated with the payment card, such as a PIN of a debit card, the billing postal (zip) code of a credit card, etc. In an example, PIN pad 212 can be a physical PED, such as a number pad with hard keys, and/or a virtual PED on display 208 can be used, as described further herein. As noted above, other devices may be included within user interface 202, which may also be configured to facilitate financial transactions for the dispensed fuel. For example, a cash acceptor may be configured to handle transactions involving cash payments, while a receipt printer is configured to print a receipt upon completion of the fueling process if desired.

User interface 202 may also be configured to exchange information with a user unrelated to the fueling transaction. For instance, display 208 may be configured to provide advertisements or other information to the user, such as advertisements regarding items available for sale in the associated convenience store. PIN pad 212 (or a set of soft keys, such as those referenced below) may be configured to receive a selection from the user regarding the displayed information, such as whether the user is interested in nearby amenities. In this regard, for example, PIN pad 212 can be used in conjunction with the card reader 210 and/or display 208 to communicate data that is not as sensitive as payment information as well.

Further, a fueling environment 100 (FIG. 1) can be configured such that fuel dispenser 200 may be operatively connected to a wide area network (WAN) 228, such as the Internet. It should be understood that fuel dispenser 200 may be connected either directly to WAN 228 or indirectly via one or more additional components, such as one or more devices 226. It is to be appreciated that the additional components may include routers, switches, gateways, and other devices that participate in the LAN referenced above. In one example, devices 226 can include one or more of POS 106, site controller 108 to which the fuel dispenser is directly connected, etc. Alternatively, fuel dispenser 200 is operatively connected to POS 106 and/or site controller 108 indirectly via the LAN. An example of a suitable configuration of the fueling environment's computing devices is set forth in U.S. Patent Publication No. 2010/0268612, as referenced above. It should also be understood that other external resources, such as a server 230, may be operatively connected to WAN 228 and accessible to fuel dispenser 200 and/or fueling environment 100 (FIG. 1) via the WAN.

Figure 3:
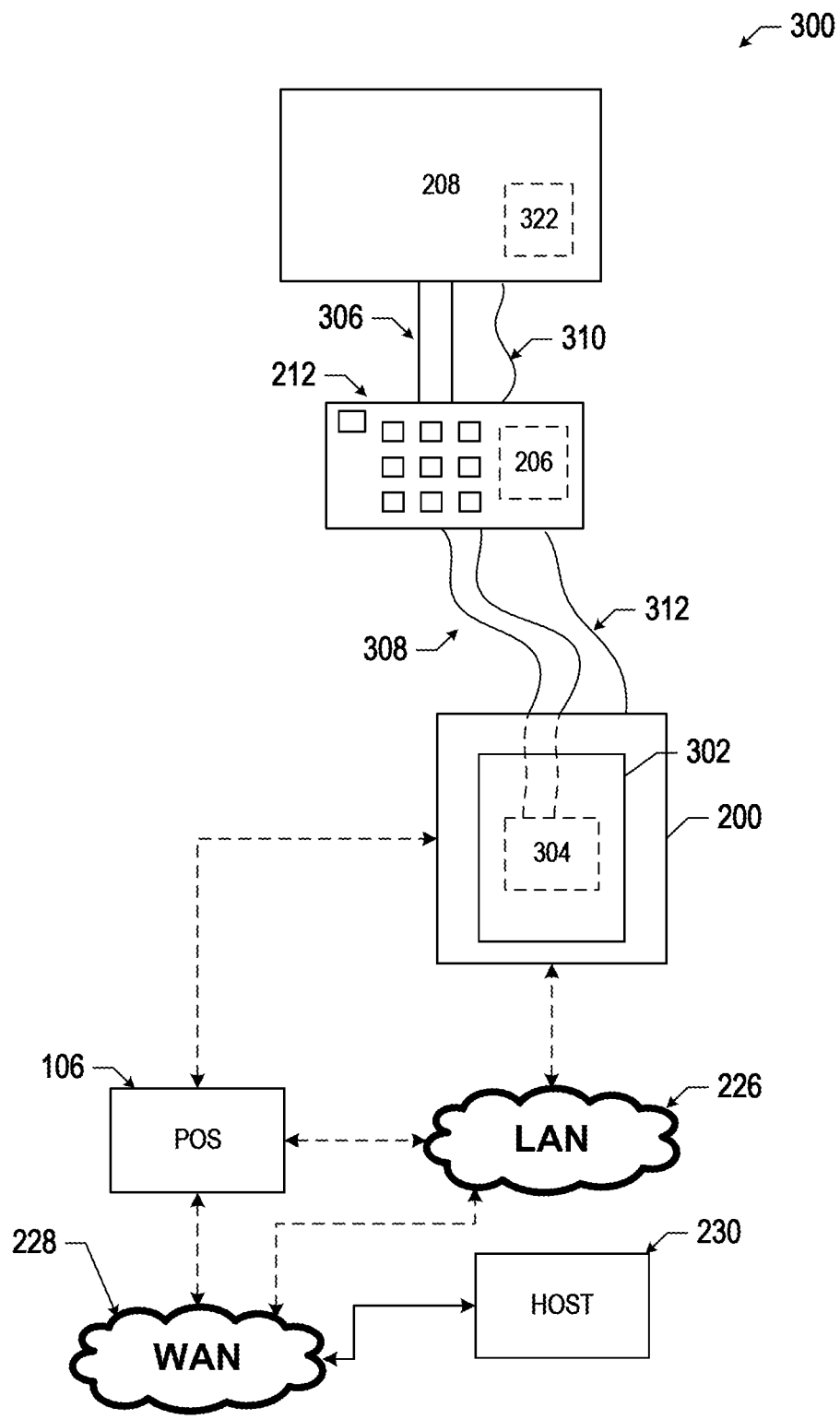
FIG. 3 is a diagrammatic representation of components of a user interface of a fuel dispenser in accordance with aspects described herein.

FIG. 3 illustrates a fuel dispensing system 300 for providing touchscreen display functionality. For example, fuel dispensing system 300 can provide video services from a host 230 or other external feature source. Fuel dispensing system 300 includes a fuel dispenser 200 with a touchscreen display 208 and a PED 212. In addition, the fuel dispenser 200 can include an auxiliary feature processor (AFP) 302, or other feature electronics, for executing applications that may access the display 208 via PED 212. AFP 302 can also include a system on module (SoM) 304 that provides a system for executing the applications and/or interfacing with PED 212. System 300 also includes a LAN 226, POS 106, WAN 228, and host 230. For example, fuel dispenser 200 can communicate in LAN 226 via POS 106 or another component, such as a router or other network device. In addition, LAN 226 can be coupled to WAN 228 (e.g., directly, via POS 106, via other network devices, etc.), and can thus allow fuel dispenser 200 to communicate with remote components, such as host 230. In yet another example, fuel dispenser 200 can access WAN 228 through other components, such as an integrated cellular modem (not shown) that allows access to WAN 228 via a mobile network (not shown), and/or the like.

Fuel dispensing system 300 allows for fueling operation via a plurality of fuel dispensing components (not shown). Additionally, host 230 may provide video, such as advertisements or other content, to one or more applications executing on AFP 302, or may provide the application or at least some functionality thereof in a service model, etc. In any case, AFP 302 can request at least some access to display 208 for one or more applications executing thereon. The PED 212 can manage access to the display 208, as described, to ensure security thereof. Secure communications between the PED 212 and display 208 can be beneficial in this example, to prevent applications from obtaining confidential information via the display 208 when unauthorized.

For example, PED 212 can secure communications to/from display 208 by controlling the display 208 via a secured touch controller 206. In one example, PED 212 may not include a number pad, as the touchscreen display 208 may be used to convey numeric data. In this example, PED 212 can be a secure device that includes other electronics or components employed by PEDs to prevent tampering (e.g., a wire mesh). For example, as PEDs are typically used to obtain PIN numbers, billing zip codes, or other information for processing transaction payments, PEDs are physically secured, as described further herein, to prevent unauthorized entry or other access that may result in exposing such information. The PEDs can be physically secured according to specifications of one or more standardizing organizations to ensure adequate protection of users using the PEDs. In any case, PED 212 can provide physical anti-tampering components or other measures by which the secured touch controller 206 is secured. PED 212 can also employ one or more controllers (not shown), printed circuit boards (PCB), processors, etc. to provide functionality described herein.

PED 212 can be connected to display 208 via a cable 306, or other communications medium, to control access thereto. In addition, PED 212 can be connected to AFP 302 and/or SoM 304 via cable 308, or other communications medium. Moreover, it is to be appreciated that the cables 306 and/or 308 can connect directly to secured touch controller 206 and/or electronics in communication therewith. In any case, SoM 304 can establish a secure channel with PED 212 to facilitate accessing certain functions of the display 208, such as display output, touch input information, etc. In one example, SoM 304 can verify whether applications executing on AFP 302 and requesting access to touch display 208 are signed by authorized entities, and can utilize PED 212 to provide different levels of functionality and/or security based on such. In other examples, unsigned applications can attempt limited access to display 208 via a direct unsecured connection between AFP 302 and PED 212.

In one example, PED 212 can provide varying levels of access to display 208 via the secured touch controller 206 based on at least one of a status of the display 208, whether an application requesting access is signed, whether a request for access originates from the SoM 304 or AFP 302, one or more parameters in the request, and/or the like. In one example, PED 212 can provide access to at least one of a display functionality of the display 208, touch input events on the display 208, limited touch input information (e.g., a limited number of touchable regions), and/or the like. Thus, for example, PED 212 can provide limited or no touch input event information to applications that are unsigned or request access directly from AFP 302, while providing full touch input event information to signed applications accessing PED 212 via SoM 304.

The cables 306 and 308 can be secured to prevent tampering therewith to achieve unauthorized access to display 208 and/or associated touch input data. In one example, the cable 306 may be any suitable cable, such as a flexible circuit assembly, Ethernet cable, universal serial bus (USB) cable, etc. securely attached to display 208 and/or PED 212. According to one example, a flexible circuit assembly may take the form of a tamper-proof cable such as that described in U.S. Patent Publication No. 2013/0300453, as referenced above. In this example, the flexible circuit assembly includes two or more layers and is in electrical communication with a secure area in the PED 212, which can include the secured touch controller 206. Each of these layers can include a thin, flexible dielectric substrate having conductors thereon. The signal conductors can be surrounded with a conductor pattern defining a wire mesh. Thus, if access is attempted via the signal conductors, such as by separating the layers, the wire mesh is interrupted, which can trigger an anti-tampering event. For example, such events can include causing erasure of certain information (e.g., encryption information, payment or other sensitive information, etc.) from a memory of secured touch controller 206, PED 212, AFP 302, SoM 304, etc., decommissioning of secured touch controller 206, PED 212, display 208, AFP 302, SoM 304, etc., and/or the like. In an example, a suitable adhesive is used to connect these various layers together to form the mesh.

When assembled, these layers define a cable extending between connector portions on the display 208 and the PED 212 (or the secured touch controller 206). One end of flexible circuit assembly 306 can connect to display 208 via a connector portion thereof, and another end of flexible circuit assembly 306 can connect to PED 212 (or secured touch controller 206) via a connector portion thereof. Similarly, SoM 304 (or AFP 302) can have a connector portion for connecting cable 308, and PED 212 (or secured touch controller 206) can have another connector portion for cable 308. The connector portions may take the form of any secure connector device, such as connector portion 312 discussed in U.S. patent application Ser. No. 13/467,592. The connector portions may be connected to display 208, PED 212 (or secured touch controller 206), SoM 304 (or AFP 302), using a suitable adhesive, such as the conductive adhesive described in U.S. patent application Ser. No. 13/467,592.

As noted above, the cable can include internal conductors that directly connect and allow electronic communications between PED 212 (or secured touch controller 206) and display 208. In one example, secured touch controller 206 can be implemented on a printed circuit board within the PED 212, and the cable can connect from the PCB to display 208. In another example, display 208 may include a display controller 322, which can be a dumb controller that forwards touch input events over cable 306 and/or causes display of data received over cable 306. In an example, display controller 322 can exist on a PCB of display 208, and the cable can run from the PCB of display 208 to the PCB of PED 212. This can allow PED 212 to send data, such as display data, securely to display 208 within tamper-proof flexible circuit assembly 302, and/or securely receive touch input events from the display 208.

Because of the flexibility of a flexible circuit assembly, it will be appreciated that display 208 can be hingedly-moved relative to PED 212 while being electrically connected to PED 212. Additionally, a flexible circuit assembly allows display 208 to be mounted at a physical location on the fuel dispenser 200 separate from the mounting location of the PED 212. It is to be appreciated that similar cabling can be used as cable 308 between PED 212 and SoM 304.

In an example, a flexible circuit assembly employed as cable 306 and/or 308 can be a ribbon-cable or similar cable that couples components for communication therebetween. In one example, a flexible circuit assembly can include multiple cables, where at least one cable carries video data, and the other cable is used for security detection. In one example, one cable facilitates communicating display data between PED 212 and display 208 and has security mesh layers, as described, triggering an anti-tampering event if tampering is detected. This cable can additionally include a switch circuit at least at one connector of the cable that utilizes a ground connection at the component to detect removal of the cable, which can trigger an anti-tampering event (e.g., memory erasure, component decommissioning, etc.). In this example, another cable can provide the security mesh circuit series-connected with two dome switches (or other suitable switches to detect separation or movement of one or more components), and can be bonded or otherwise mounted to the other cable and/or can loop such that a dome switch is used to determine if a bracket over a connector of the other cable is disassembled, which can trigger an anti-tampering event. This cable can continue to another dome switch between display 208 and a bezel, or other portion of a fuel dispenser, to determine if display 208 is removed therefrom; this can also trigger an anti-tampering event.

In any case, the triggered anti-tampering events can cause various functionalities, and triggering of different switches can cause different event functionalities, in an example. In addition, the functionalities can require different resolutions. For example, removal of display 208 from the bezel can cause decommissioning of the PED 212 and/or display 208, such that the display can be reinstalled to contact the bezel, and normal operation can resume. Removal of cable 308 from PED 212 or SoM 304, however, can cause erasure of encryption information used to communicate between PED 212 and SoM 304. Reestablishing encryption information can require a technician to replace the cable 308, and/or reinitialize encryption information between PED 212 and SoM 304 in a clean room for reinstallation in the fuel dispenser 200, and/or the like. It is to be appreciated that various triggerable events can be used in this regard with varying remedial measures to reset the events.

In an example, multiple cables 306 and 310 and connectors can be used to connect display 208 and PED 212 and/or multiple cables 308 and 312 and connectors can be used to connect PED 212 and SoM 304. For example, two cables and two sets of connectors can be employed to connect display 208 with PED 212 (or secured touch controller 206). In an example, PED 212 (and/or secured touch controller 206) includes a touch feature connector to allow touch input information over one cable, and a video feature connector to allow display functionality over the other. For example, cable 306 can be connected to the touch feature connector, and can be secured, as described, while the other cable 310 for display functionality can be connected to the video feature connector, and may not need to be secured. A similar configuration can be employed to connect PED 212 with SoM 304 (or AFP 302) using cables 308 and 312.

In one example described in further detail below, display output from SoM 304 (or AFP 302) may be provided to the display 208 via PED 212 over cables 312 and 310 without prior authentication of the related application; thus, display data received over the video feature connector(s) can be provided to the display 208 for displaying without authentication. Conversely, in this example, data to be provided to an application using the touch feature connector over cables 306 and 308 can first require that the application be authenticated by SoM 304 and/or PED 212 before the touch input is provided thereto by secured touch controller 206. Moreover, data communicated over cables 306 and/or 308 can be encrypted over the secure channel, and in one example, data over cables 310 and 312 may not need to be encrypted.

Figure 4:
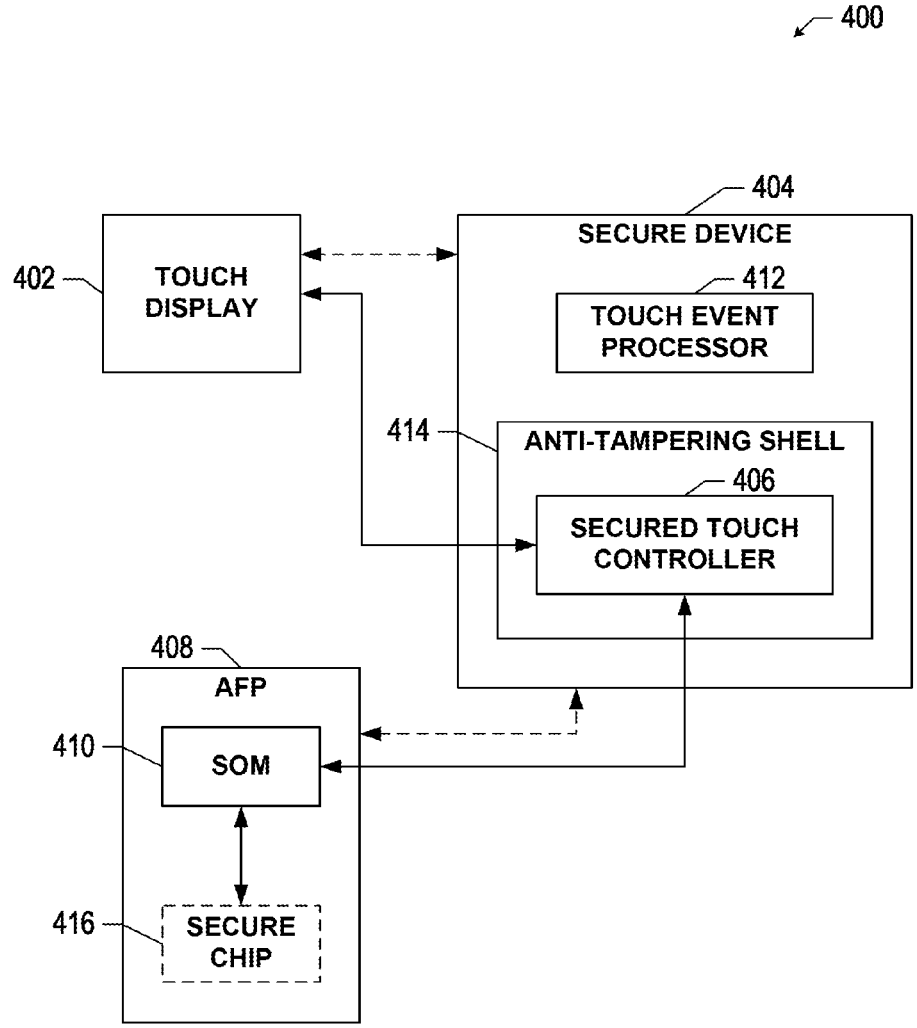
FIG. 4 is an example system for employing in a fuel dispenser to allow touchscreen input.

FIG. 4 illustrates an example system 400 for controlling a touch display via a secured touch controller. System 400 includes a touch display 402 communicatively coupled to a secure device 404 and/or a secured touch controller 406 thereof. In addition, system 400 includes an AFP 408 for executing one or more applications that utilizes one or more functions of touch display 402. AFP 408 can include a SoM 410, as described, for managing communication with the touch display 402 via secure device 404. It is to be appreciated that touch display 402 can be similar to display 208, secure device 404 can be similar to PED 212 (e.g., with or without a PIN pad), AFP 408 can be similar to AFP 302, SoM 410 can be similar to SoM 304, etc.

Secure device 404 can include a touch event processor 412 that can obtain touch events from touch display 402, and determine information for providing to AFP 408, SoM 410, etc., based on one or more considerations regarding an application to which the touch input relates. In another example, touch event processor 412 can indicate a format of touch input information to touch display 402 for sending the information to secured touch controller 406. In addition, secured touch controller 406 can be secured in secure device 404 via an anti-tampering shell 414. It is to be appreciated that cabling to/from touch display 402 and/or SoM 410 (or AFP 408) can be installed under the anti-tampering shell as well to prevent physical access thereof. In addition, for example, the AFP 408 can be installed on a hub interface PCB (HIP), which can include two AFPs (e.g., one on each side) for a dual sided fuel dispenser.

According to an example, secure device 404 can manage access to touch display 402, which can be based on parameters received in a request to access touch display 402, whether the touch display 402 is in use by an application, and/or the like. In one example, secure device 404 can limit access to touch display 402 for certain applications by allowing only display access, limited touch access, full touch access, and/or the like. For example, limited touch access can include allowing access to one or more limited regions of the touch display 402 and/or limiting a number of active touch regions on the touch display 402. Secure device 404 can limit access to touch display 402 based on at least one of one or more parameters associated with an application accessing the touch display 402, whether the access request initiates from SoM 410 or AFP 408, whether an application accessing the touch display 402 is signed by an authorized entity, etc.

In an example, SoM 410 can check whether applications requesting access to touch display 402 are signed by an authorized entity. This can occur based on receiving a request for access to the touch display 402, upon executing of the application at SoM 410, and/or the like. SoM 410 can indicate whether the application is signed by an authorized entity to secure device 404 (e.g., as an explicit indication, as part of an access request from the application, as part of a ping message sent while the application is executing, etc.). In one example, SoM 410 can check whether the applications are signed, and can compare a signature thereof to a stored list of signatures of authorized entities to determine whether the one or more applications are signed by a signature of an authorized entity. The list of signatures can include a signature corresponding to a manufacturer of a fuel dispenser or a retail site, a payment institution, etc., as described further herein. Moreover, in an example, the SoM 410 can be provisioned with the list of signatures (e.g., in a clean room prior to installation of the SoM 410 in a fuel dispenser), can obtain the list of signatures from a remote source (e.g., upon installation in a fuel dispenser, as a list pushed from one or more entities, etc.), can obtain the list of signatures from the secure device 404 (e.g., upon establishing the secure channel), and/or the like.

In addition, SoM 410 can establish a secure channel with the secure device 404 and can communicate the indication over the secure channel. In another example, communicating with secure device 404 over the secure channel can imply that the application is signed by an authorized entity. In this example, SoM 410 can also communicate with secure device 404 over another link where the application is not signed by an authorized entity. In yet another example, SoM 410 can refrain from communicating touch display 402 access requests from applications not signed by an authorized entity to secure device 404, and AFP 408 can communicate the request outside of SoM 410. In any case, secure device 404 can determine whether the application is signed and/or a related signing entity, and can thus determine information regarding the application and a level of access to provide to the application via secured touch controller 406 based on the information.

In an example, AFP 408 can include a secure chip 416, with which SoM 410 can communicate to obtain information to establish the secure channel with secure device 404. The SoM 410 can include the secure chip 416, in one example. Where secure chip 416 is present, secure chip 416 and secure device 404 can be provisioned with related encryption information to allow encrypted communications with the secure device 404 using the encryption information (e.g., encryption keys, certificates, or other functions). This can occur in a clean room or otherwise before installation in a fuel dispenser to ensure tamper-proof provisioning. In addition, as described, where tampering is detected on a cable between the secure device 404 and SoM 410 or with another component of system 400, the contents of secure chip 416 can be deleted (e.g., by secure chip 416 based on detecting the tampering by secure chip 416, SoM 410, or another device on the AFP 408) to ensure integrity of the encryption information established prior to installation.

In another example, where secure chip 416 is not used to establish the secure channel with secure device 404, SoM 410 can be configured with the encryption information (e.g., encryption keys, certificates, or other functions). For example, SoM 410 can execute a software configuration process with secure device 404 where SoM 410 can store the encryption information in a memory. In another example, a given application executing on SoM 410 can receive an encryption key for which secure device 404 has a corresponding encryption key to facilitate secure communications therebetween. For example, the encryption keys can correspond to a public/private key pair of a public-key cryptography algorithm (e.g., Rivest, Shamir, and Adleman (RSA), Diffe-Hellman, digital signature standard (DSS), etc.).

In this example, secure device 404 can be programmed with the private key, and applications executing on SoM 410 can be provisioned with a matching public key to allow establishment of the secure channel. In one example, the application obtains the public key as part of an authentication process, which can occur prior to execution of the application at the fuel dispenser. Authentication of the application can occur outside of the fuel dispensing environment, in one example, such that applications can be signed by or otherwise associated with certain parties (e.g., a retail site operating the fuel dispenser). Where the associated entity is authorized to execute applications at the fuel dispenser, the application can then be signed with a signature of the manufacturer of the fuel dispenser (or other signature that allows executing the application on a given fuel dispenser). As part of this signing, the application can obtain the public key for encrypting communications to the secure device 404. For example, the public key can be unique to the entity authorized to execute the application.

Subsequently, the application can be executed on SoM 410, the signature of the manufacturer is verified by SoM 410 and/or secure device 404 in determining a level of access to provide to touch display 402, and the public key can be used to encrypt communications with secure device 404 over the secure channel. Secure device 404 can attempt to establish a secure channel with SoM 410 for the given application using the encryption key pair (and/or vice versa). If successful, secure device 404 can consider the application as signed by an authorized entity, and can accordingly provide the appropriate level of touch display 402 event information thereto (e.g., coordinate-level, motion-level, or similar information). If unsuccessful, secure device 404 can consider the application as not signed by an authorized entity, and can accordingly limit touch display 402 event information, as described (e.g., by providing only region-level information of a touch event for a limited number of regions on the touch display 402). In these examples, it is to be appreciated that secure chip 416 may be present and used to store encryption information of an application or otherwise received from secure device 404.

SoM 410 can notify secure device 404 when an application is signed by an authorized entity over the secure channel, which can occur based on executing the application, as part of a request for accessing touch display 402, and/or the like. In an example, SoM 410 can request touch input information from secure device 404 for a given application. Secure device 404 can obtain touch input information from secured touch controller 406 for providing to SoM 410 based on the request from the application when the secure device 404 determines the application is signed by an authorized entity. Thus, when touch display 402 interactions occur (e.g., a user touches the touch display 402), the touch event processor 412 can process related event information and provide the information to secure device 404 for communicating to SoM 410. In an example, touch event processor 412 can interpret touch data to include coordinates of the interaction, a type of interaction (e.g., touch, swipe, double tap, etc.), and/or the like. Secure device 404 can determine at least a subset of the information to provide to SoM 410 based on the information regarding the application requesting the touch input information.

For example, for applications signed by an authorized entity (such as a manufacturer of a fuel dispenser, an operator of a retail site, etc.), secure device 404 can communicate coordinates of touch input and related interactions on touch display 402 to SoM 410, and SoM 410 can provide the data to the application executing thereon or otherwise on AFP 408. Applications signed by an authorized entity can include payment applications that render a PIN pad, a kitchen menu application for the retail site, etc., and specific touch input information can be provided to these applications executing on AFP 408 or SoM 410 by secure device 404. For example, secure device 404 can encrypt the touch information for communicating over the secure channel with SoM 410 for such applications, as described. In any case, the applications can render substantially any interface and receive specific touch event information on the interface. This can allow for rendering and proper functioning of a PIN pad on touch display 402, in one example.

For applications that are signed by a non-authorized entity and/or unsigned, secure device 404 can return more generic information regarding touch input on touch display 402, such as an indication of one of a number of regions in which a touch occurs, or can refrain from providing any touch input information to the applications. Such applications may include advertisement applications. Providing such limited touch event information can mitigate occurrence of tampering by rogue applications, as the applications are either not receiving the touch input data, or receiving a limited amount of information from which confidential information may be not discerned.

In a specific example, secure device 404 can limit touch display 402 by defining eight adjacent or non-adjacent regions of touch display 402, and can return an indication of a region within which touch input occurs to unauthorized applications. This essentially allows for limiting functionality on the touch display 402. In this example, a ten digit number pad cannot be properly used by an unauthorized application because input can only be received for eight touchable regions, thus mitigating possible tampering to obtain confidential information of a user using the touch display 402. In one example, it is to be appreciated that the application executing on SoM 410 or secure chip 416 can define the size and location of the eight touch regions, or the secure device 404 can use a default setting for the region size and location. In any case, in an example, the secure device 404 may allow the unauthorized application to specify what is displayed in the regions.

Communications between secure device 404 and SoM 410 can be encrypted, as described. In an example, all communications therebetween can be encrypted (including all events on touch display 402). In another example, a portion of events on touch display 402 can be encrypted by secure device 404 (e.g., using the private key) before sending to SoM 410. In this regard, in some examples, physical security measures described herein may not be used (e.g., secure chip 416, anti-tampering shell 414, security for cabling between SoM 410 and secure device 404, etc.), as potential eavesdropping can be hindered by the encrypted communications.

Moreover, for example, the secure device 404 can ensure it has substantially constant communication to SoM 410 as another security measure. In this example, where secure device 404 detects that communication with SoM 410 is interrupted and/or that the secure channel is not established, secure device 404 can at least one of refrain from communicating touch input information to SoM 410, disable touch display 402, etc. In one example, SoM 410 can consistently ping secure device 404 to maintain the secure channel. This can include sending a ping message to the secure device 404. Thus, where a ping message is not detected by secure device 404 for a period of time, this may indicate tampering, and secure device 404 can refrain from sending touch input to the SoM 410, disable the touch display 402 (e.g., via secured touch controller 406), and/or the like. It is to be appreciated that the ping message can include substantially any message transmitted to the secure device 404 to indicate proper functioning of the SoM 410. Moreover, for example, the SoM 410 can apply an authenticity parameter to the ping message to allow secure device 404 to verify authenticity thereof to ensure the ping message is from the SoM 410 (e.g., and not from a rogue device intending to falsely represent the SoM 410). For instance, applying the authenticity parameter can include SoM 410 encrypting the ping message, and the secure device 404 can decrypt the ping message (e.g., using a key pair) to ensure the message is from SoM 410. In another example, the applying the authenticity parameter can include SoM 410 including a hash value as part of the ping message, and the secure device 404 can verify the hash value (e.g., using one or more functions) to ensure the message is from SoM 410.

SoM 410 can include a core level application, such as an operating system, that can communicate with the secure device 404, establish the secure channel with the secure device 404, etc. In this regard, the core level application of SoM 410 can maintain the secure channel with secure device 404 and indicate whether a request for touch display 402 access is for an authorized application or not. For example, the applications can execute on SoM 410 (or on AFP 408 and request touch display 402 access via SoM 410), and the core level application of SoM 410 can determine whether the applications are signed by an authorized entity, as described herein. and indicate such to secure device 404.

Furthermore, an anti-tampering shell 414 can encase the secured touch controller 406 as well to mitigate tampering with the controller 406 and/or any cables coupling the controller 406 to the touch display 402. As described, anti-tampering shell 414 can include mesh layers to detect movement, removal, or other tampering with the shell 414 or components disposed therein. In addition, a secure cable can be used to couple secured touch controller 406 (e.g., under the anti-tampering shell 414) with touch display 402. The secure cable can be similar to the flexible circuit assembly discussed previously, in one example. Also, for example, touch display 402 can utilize one or more microswitches or other detection mechanisms to detect movement or removal thereof.

Figure 5:
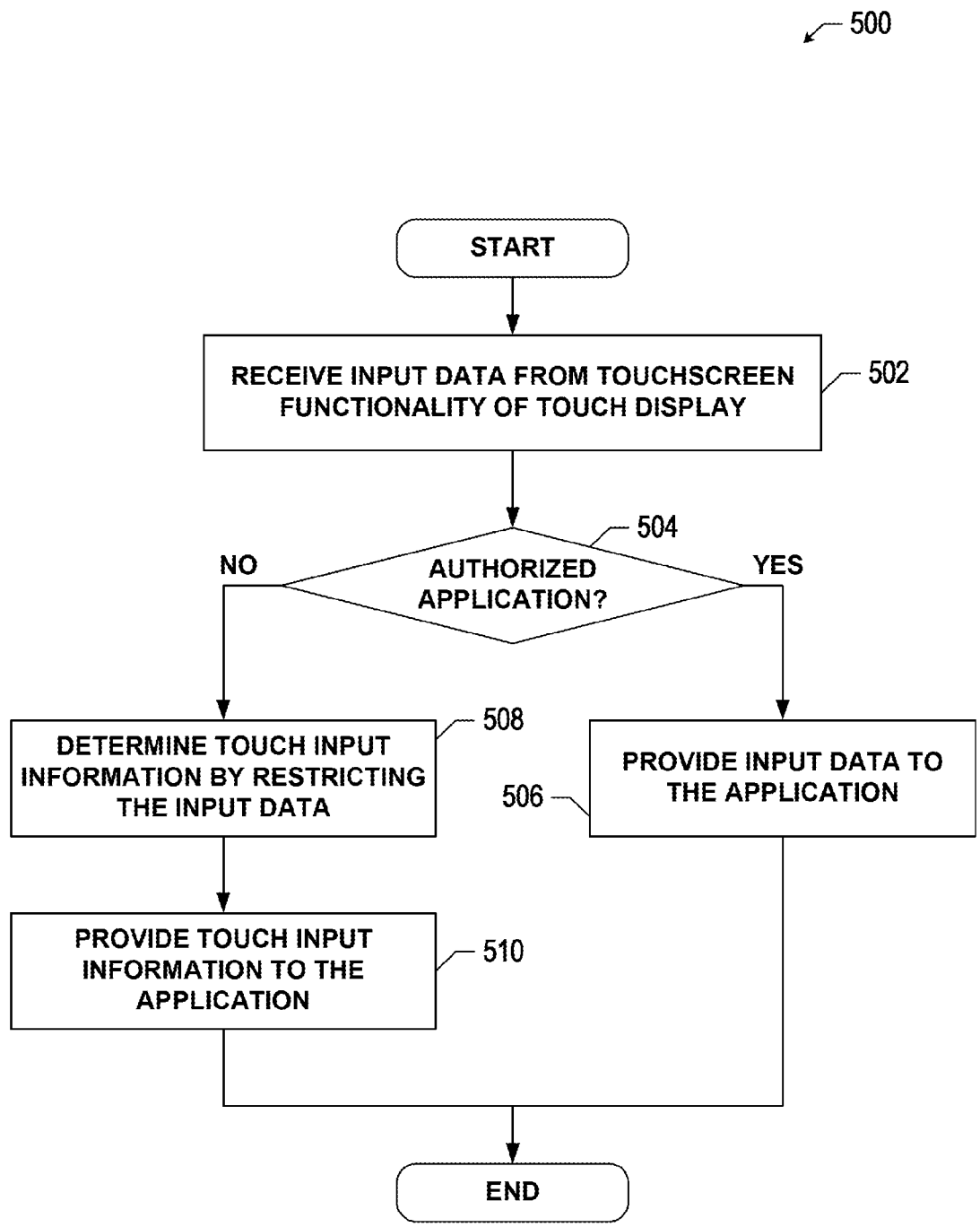
FIG. 5 is an example methodology for processing requests to access a touch display.

Referring to FIG. 5, a methodology that can be utilized in accordance with various aspects described herein is illustrated. While, for purposes of simplicity of explanation, the methodology is shown and described as a series of acts, it is to be understood and appreciated that the methodology is not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

FIG. 5 illustrates an example methodology 500 for processing input data received at a touch display. For example, the methodology 500 can be implemented by a secure device, as described, that manages touch display access of one or more applications. At 502, input data can be received from touchscreen functionality of a touch display. For example, the input data can relate to coordinates of a touch interaction on the touch display, a type of interaction (e.g., single touch, double tap, swipe, etc.), and/or the like.

At 504, it can be determined whether the application is authorized, which can include determining whether the application is signed by an authorized entity or signed at all. This can impact touch input information (if any) provided to the application. In addition, the determination can be made by comparing a signature of the application to a list of signatures of authorized entities, receiving a related indication from a SoM or other device, etc., as described. In addition, the determination can be based on whether a secure channel is established with the application or related processor on which the application executes. As described, the application can use a public key to encrypt communications, and the communications can be decrypted with a private key. Where the communications are properly decrypted, this can indicate the application is authorized at 504.

When the application is authorized, at 504, input data can be provided to the application at 506. This can include communicating the input data as received, such as the coordinates or touch interaction type information. In addition, the input data can be formatted before providing to the application. Moreover, the input data can be encrypted, as described. In any case, the authorized application receives more specific touch input information than an unauthorized application.

When the application is unauthorized at 504, touch input information can be determined by restricting the input data at 508. This can include determining a region in which touch interactions occur based on the input data as the touch input information. Therefore, only information regarding a number of limited touch regions can be provided to unauthorized applications to prevent rogue applications from obtaining confidential information (e.g., by displaying a PIN pad). In other examples, the restricted touch input information can indicate occurrence of a touch event, or other limited information. The touch input information is provided to the unauthorized application at 510.

While one or more aspects have been described above, it should be understood that any and all equivalent realizations of the presented aspects are included within the scope and spirit thereof. The aspects depicted are presented by way of example only and are not intended as limitations upon the various aspects that can be implemented in view of the descriptions. Thus, it should be understood by those of ordinary skill in this art that the presented subject matter is not limited to these aspects since modifications can be made. Therefore, it is contemplated that any and all such embodiments are included in the presented subject matter as may fall within the scope and spirit thereof.

What is claimed is:

1. A method for controlling access to a touch display, comprising:
   receiving input data from a touch display, wherein the input data is associated with an application accessing the touch display;
   determining whether the application is signed by an authorized entity based at least in part on determining whether a secure channel is established with the application via an encryption key pair wherein the application has one key of the encryption key pair and another key of the encryption key pair is stored at a secure device that controls the touch display, wherein the one key is previously provided as part of an application verification process; and
   providing touch input information correlating to the input data to the application based at least in part on whether the application is signed by the authorized entity.

2. The method of claim 1, further comprising generating the touch input information by restricting the input data where the application is not signed by an authorized entity.

3. The method of claim 2, wherein the generating the touch input information comprises determining one of a fixed number of regions on the touch display correlating to the input data as the touch input information.

4. The method of claim 2, wherein the generating the touch input information comprises determining coordinate information correlating to the input data as the touch input information.

5. The method of claim 1, wherein the secure channel communicates the input data to a processor.

6. The method of claim 5, further comprising maintaining the secure channel at least in part by determining whether a consistent ping message is received from the processor.

7. The method of claim 6, further comprising disabling the touch display based at least in part on determining that the consistent ping message is not received from the processor over a period of time.

8. The method of claim 6, further comprising erasing at least a portion of a memory upon detecting removal of at least one cable to the processor or to the touch display.

9. The method of claim 1, further comprising encrypting a portion of the touch input information for communicating to the application over the secure channel.

* * * * *